United States Patent [19]

Eriksson

[11] 4,252,230

[45] Feb. 24, 1981

[54] CONTAINER-ADVANCING APPARATUS

[76] Inventor: Karl E. I. Eriksson, Box 6001, S-700 06 Örebro, Sweden

[21] Appl. No.: 909,088

[22] Filed: May 24, 1978

[51] Int. Cl.³ .................... B65G 25/02; B65G 47/74
[52] U.S. Cl. .................................. 198/344; 198/488; 198/740
[58] Field of Search ............... 198/339, 344, 345, 457, 198/475, 476, 487, 488, 599, 740; 209/522–533, 538

[56] References Cited

U.S. PATENT DOCUMENTS

| | | | |
|---|---|---|---|
| 2,357,799 | 9/1944 | Almgren | 198/487 |
| 2,863,355 | 12/1958 | Ledingham et al. | 198/599 X |
| 3,701,407 | 10/1972 | Kulig | 198/476 X |
| 3,710,937 | 1/1973 | Cook | 209/523 |

FOREIGN PATENT DOCUMENTS 360332 9/1973 Sweden.

*Primary Examiner*—Jeffrey V. Nase
*Attorney, Agent, or Firm*—Sughrue, Rothwell, Mion, Zinn and Macpeak

[57] ABSTRACT

An apparatus for guiding a series of objects, such as glass bottles, from a conveyor and advancing said objects stepwise between a plurality of inspection stations, and then returning said objects to said conveyor. The apparatus comprises a continuously driven feed mechanism cooperating with an arrangement for feeding the objects stepwise between the inspection stations, and is arranged to be placed adjacent the conveyor to receive objects from the conveyor. The feed mechanism synchronously and with great accuracy are arranged to feed objects to a receiving position and to feed objects from a dispatch position of the arrangement for feeding the objects stepwise between said inspection stations. The arrangement being arranged to feed said objects stepwise in opposite directions along two parallel paths by an elongate carrier arranged between the paths and having dogging arms projecting outwardly therefrom substantially perpendicualrly to the paths, and which carrier is adapted to execute a continuous parallel movement in a closed path in a manner such that during one half of the movement cycle the dogging arms are caused to move objects located on one path through one step in one direction and during the other half of said cycle to move objects located on the other path through one step in the opposite direction. The apparatus further comprises a continuously driven subsystem for transferring the objects from the terminal end of one of said parallel paths to the commencement end of the other of said paths.

24 Claims, 19 Drawing Figures

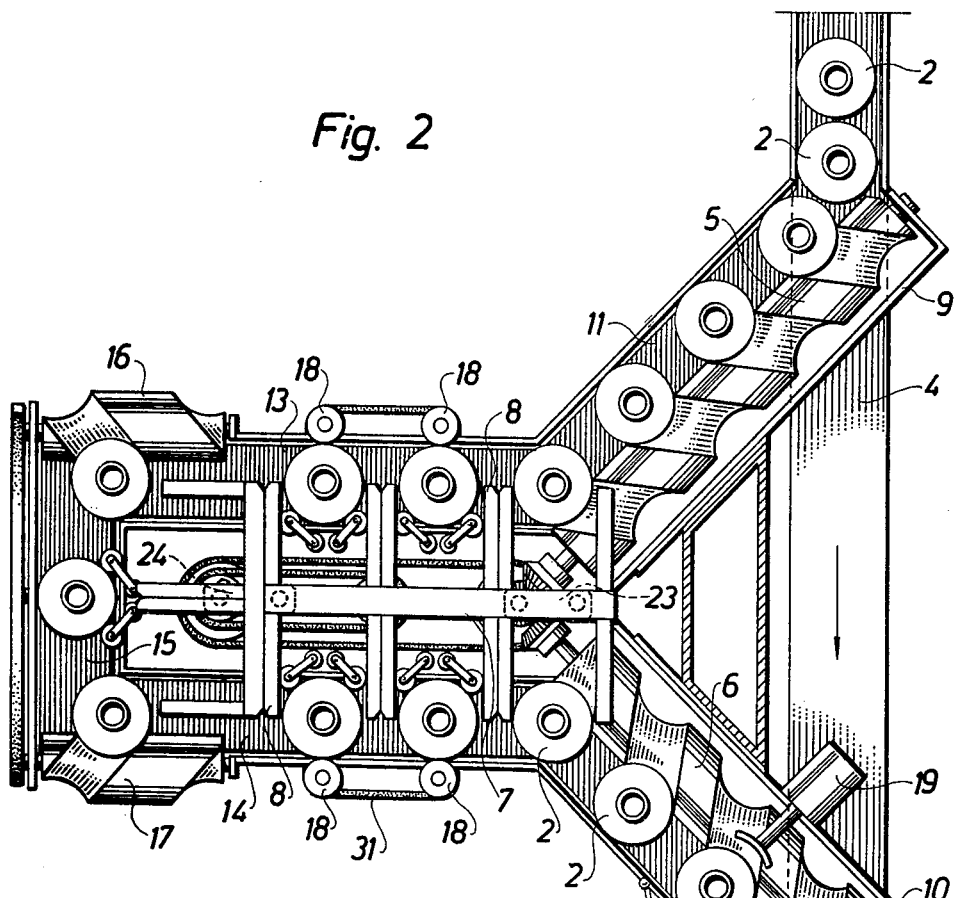
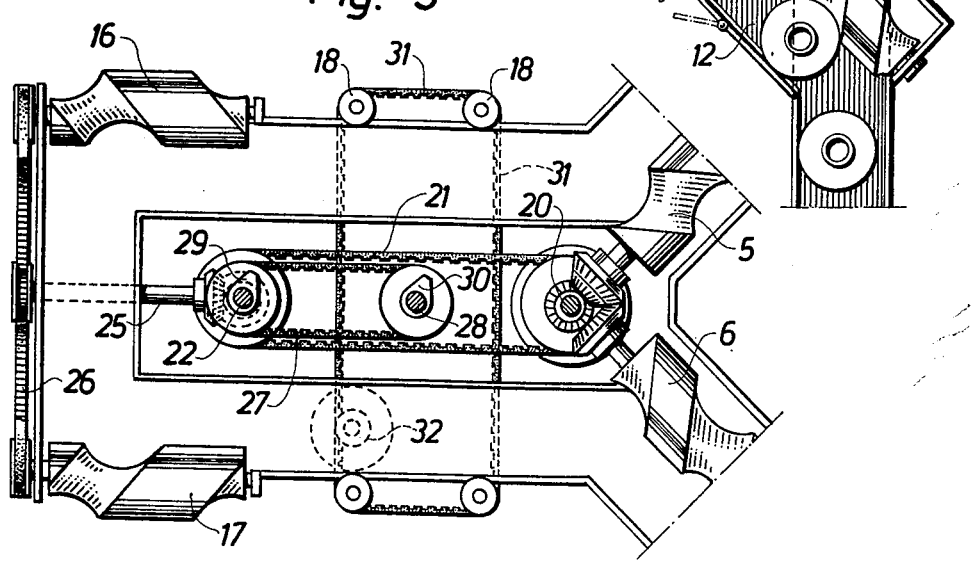

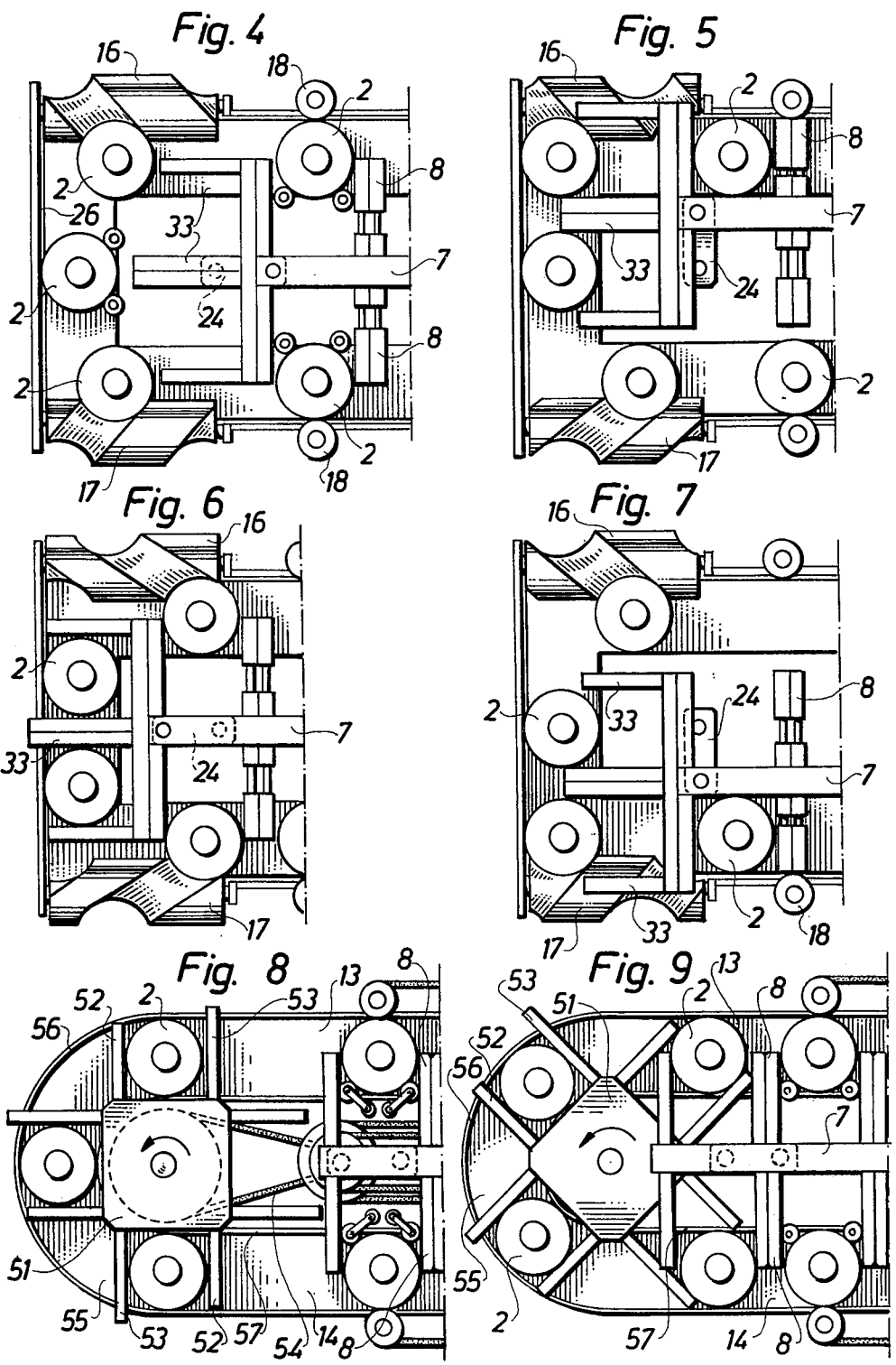

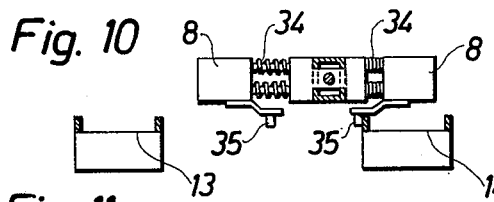
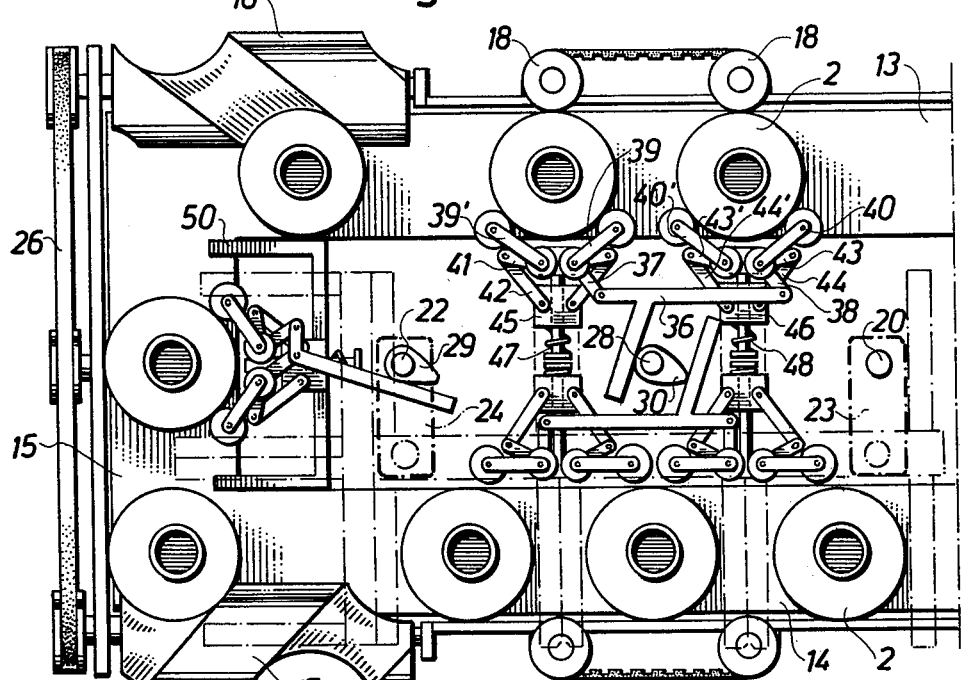
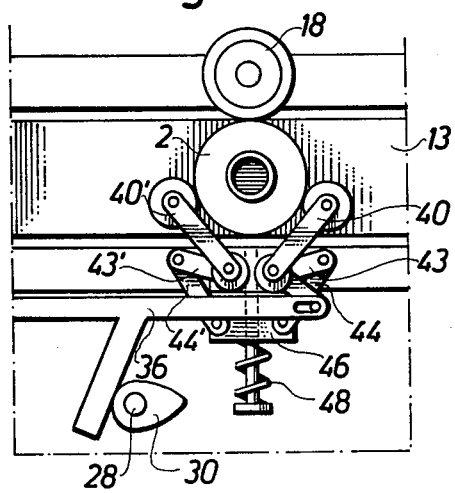
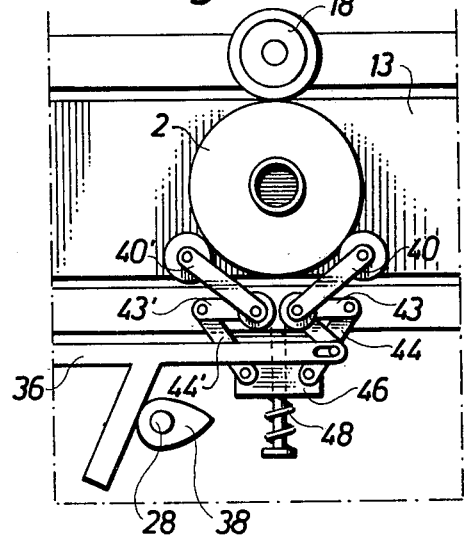

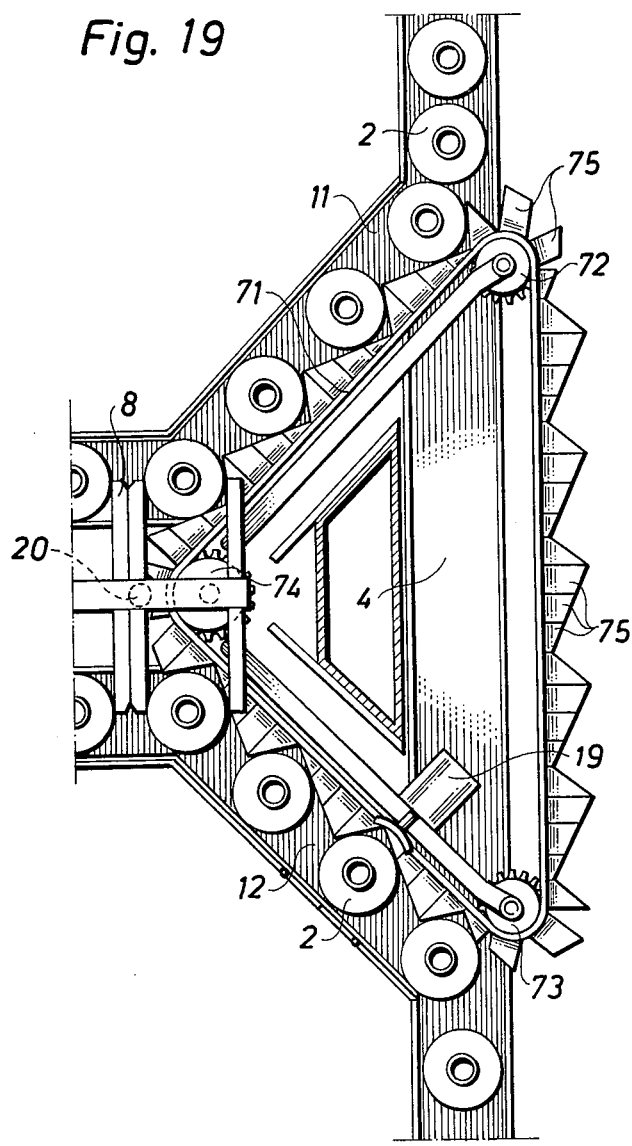

CONTAINER-ADVANCING APPARATUS

The present invention relates generally to an apparatus for inspecting a series of objects, such as glass bottles, which are indexed between different inspection stations. The invention particularly relates to an apparatus which is able to guide the objects from a conveyor into an object-inspecting means and, subsequent to the objects being inspected, to return faultless objects to the conveyor.

In the manufacture of, for example, glass containers, the containers when finished are checked for faults. For example, the containers which may be glass bottles must be checked with respect to the thickness of the glass, to ensure that they are not cracked or irregularly formed, and with respect to their roundness. The bottles are inspected suitably automatically at respective inspection stations arranged along an inspection path. In order that the bottles can be inspected at the same rate as they are produced, the inspection operations must be carried out very rapidly and the time taken for the bottles to move between the different stations must be a minimum. Desirably, it should be possible to inspect at least 200–300 bottles per minute. This places very high requirements on the means by which the bottles are advanced, whereby it must be possible to accelerate and slow down the bottles quickly without the bottles being broken and whilst maintaining the necessary precision in which they need be fed to the stations. Another requirement is that the bottles shall be capable of being removed from a line or conveyor passing directly from the manufacturing machine, prior to inspecting the bottles, and that only accepted bottles are later replaced on the conveyor. Thus, the inspection apparatus shall occupy the shortest possible length of the conveyor and shall be capable of being placed in connection therewith without becoming an actual part thereof, so that one inspection apparatus can readily be exchanged for another in the event of a break down, or can be readily moved to another position along said conveyor, for example. The importance of being able to move or replace the inspection apparatus rapidly and simply will be perceived when it is understood that a breakdown of 5 minutes at an advancing speed of e.g. 300 bottles per minute results in a queue of 1500 bottles. As a result of the aforementioned high speeds at which the bottles are advanced, and for reasons of space, the apparatus should be as compact and as small as possible in order to reduce the mass of the movable components.

In Applicant's Swedish Pat. No. 360,332 there is described an apparatus for indexing objects along a path having inspection stations arranged therealong. Although this apparatus permits the objects to be inspected at a high inspection rate, it has the disadvantage that it can not readily or practically be connected to a conveyor passing from a manufacturing machine without dividing the conveyor into a section upstream of and a section downstream of the inspection apparatus, such division being undesirable for several reasons. The U.S. Pat. No. 3,710,937 describes an inspection apparatus which comprises feed screws which are obliquely positioned relative to the conveyor and which are intended to pass the objects from the conveyor and to return said objects thereto. The means by which these screws are driven and the manner in which they are journalled is such, however, as to make it impossible for the apparatus to be readily placed adjacent a conveyor or readily removed therefrom. Further, the feed screws are adapted to transfer the glass containers to an intermittently driven rotatable feed arrangement, hereinafter referred to as a rotatable table. Because the table must be quickly accelerated and retarded and because the glass containers are engaged by dogging means in an abrupt manner, such an apparatus cannot be used for the inspection of objects which are conveyed at speeds envisaged here.

The U.S. Pat. No. 2,357,799 describes an apparatus for indexing a series of objects between a number of stations in opposite directions and along two parallel paths by means of an elongate carrier arranged between said paths and a dogging device projecting outwardly substantially perpendicularly to said paths. Although such an apparatus permits a high feed rate, according to said patent specification transfer from the terminal end of one path to the beginning of the other path is effected by means of an intermittently driven rotatabele table, with all the limitations inherent in such a table. Neither can this apparatus be arranged to operate in conjunction with a manufacturing line without requiring the line to be divided. Further, the apparatus is not suited for operation in conjunction with feed screws since, inter alia, the aforementioned carrier does not incorporate any dogging devices adapted to stop the objects at exact discharge positions at the end of each path.

A main object to the invention is to provide an apparatus for removing objects from a conveyor and gently advancing said objects at high speed between a number of inspection stations and returning faultless objects to said conveyor. The apparatus comprises continuously driven feed means, cooperating with an arrangement for feeding the objects stepwise between the inspection stations.

The apparatus is characterized in that it is arranged to be placed adjacent the conveyor to receive objects from the conveyor, that said feed means synchronously and with great accuracy are arranged to feed objects to a receiving position and to feed objects from a dispatch position of the arrangement for feeding the objects stepwise between said inspection stations, that said arrangement is arranged to feed said objects stepwise in opposite directions along two parallel paths by means of an elongate carrier arranged between the paths and having dogging means projecting outwardly therefrom substantially perpendicularly to the paths, and which carrier is adapted to execute a continuous parallel movement in a closed path in a manner such that during one half of the movement cycle the dogging means are caused to move objects located on one path through one step in one direction and during the other half of said cycle to move objects located on the other path through one step in the opposite direction, and in that it comprises continuously driven means for transferring the objects from the terminal end of one of said parallel paths to the commencement of the other of said paths.

An apparatus according to the invention can be readily placed adjacent, preferably obliquely to, a production line and be readily and simply replaced by another apparatus should the one originally placed break down. Further, by means of the combination of such a continuously, or continually, driven advancing arrangement, which permits very rapid and gentle handling of the objects, with the aforementioned continuously driven feed means, it is possible to construct an inspection apparatus which has a number of important advantages over previously known apparatuses.

Preferably, the feed means are placed on the same side of the flow of objects as are the carrier provided with dogging means and project the feed means freely over the production line conveyor or over a conveyor forming a part of the apparatus and which conveyor is arranged to be placed adjacent and in parallel to the main conveyor. The feed means are driven at their inner ends from a common shaft.

The said means for transferring the objects from the terminal end of one of the parallel paths to the commencement end of the other path may comprise dogging devices carried by said carrier and extending substantially perpendicularly to a transversal path interconnecting said parallel paths. In this case there is suitably used a pair of feed screws for transferring the objects from one of said parallel paths to the transversal path and from said transversal path to the other of the parallel paths, respectively.

In accordance with another embodiment, the said means for transferring the objects from the terminal end of one of the parallel paths to the commencement end of the other of said paths may, instead, have the form of a rotatable table arrangement driven continuously, or continually, and synchronously with the advancing means, said table arrangement being provided with compartments conforming to the objects to be inspected and arranged to feed, during rotation of said table the objects along an arcuate path which connects the terminal end of one of said parallel paths with the commencement end of the other, and which is outwardly delimited by at least one arcuate guide strip arranged for co-operation with the objects.

By means of such an arrangement the objects can be engaged immediately at the end of one of the parallel paths and transferred to the beginning of the other of said paths without any intermediate coupling of conveyor screws or the like. Because the rotatable table is driven continually or continuously, the table need not be rapidly accelerated or retarded. Further, the table will subject the objects to very gentle acceleration and retardation forces, which greatly reduces the risk of the objects being damaged.

The aforementioned compartments should be arranged in pairs such that the receipt and dispatch of objects take place simultaneously. It is preferred that each of the aforementioned compartments is defined by substantially parallel side walls, which in accordance with one embodiment may comprise pairs of parallel dogging arms.

When the feed means comprises feed screws it is preferred that said screws are displaced both in the axial and the transverse directions. For this purpose the screws can be hollow and a drive shaft pass therethrough, which shaft is driven at the one end and pivotally and displaceably connected to the screw at the opposite end.

Conveniently, the carrier at the terminal end of each path comprises a dogging device which is solely adapted to stop or to slow down the objects at the associated discharge position, from which position the objects are advanced further, by means of a feed screw. The length of the dogging devices may be telescopically adjustable.

So that the invention will be more readily understood and further features thereof made apparent exemplary embodiments of the invention will now be described with reference to the accompanying schematic drawings.

FIG. 2 is a horizontal view of a feed arrangement according to the invention.

FIG. 3 illustrates the means for driving the various components of the feed arrangement shown in FIG. 2.

FIGS. 4–7 illustrate a feed cycle for the arrangement shown in FIGS. 2 and 3.

FIGS. 8 and 9 illustrate an alternative arrangement for transferring the objects between the parallel paths.

FIG. 10 illustrates schematically how the length of the dogging arms can be telescopically changed.

FIG. 11 illustrates pressing means arranged at each station.

FIGS. 12 och 13 illustrate how the pressing means shown in FIG. 11 are automatically adapted to bottles of different diameters.

Figure 14:
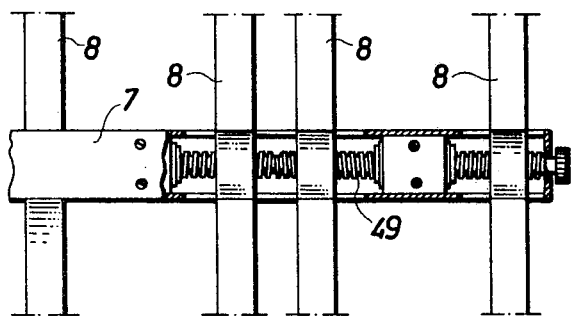

FIG. 14 illustrates how the distances between the dogging arms can be regulated from one end of the carrier.

Figure 15:
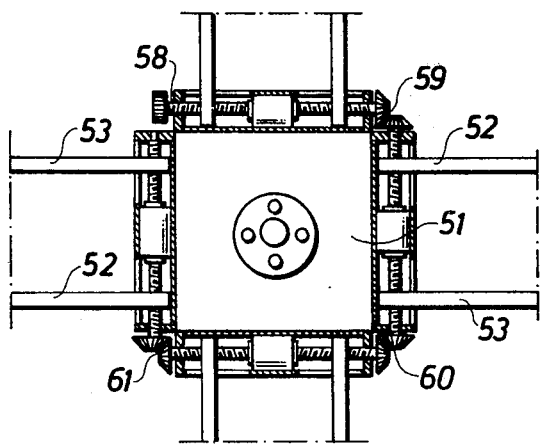

FIG. 15 illustrates an arrangement for changing the distance between the dogging arms in the arrangement illustrated in FIGS. 8 and 9.

Figure 16:
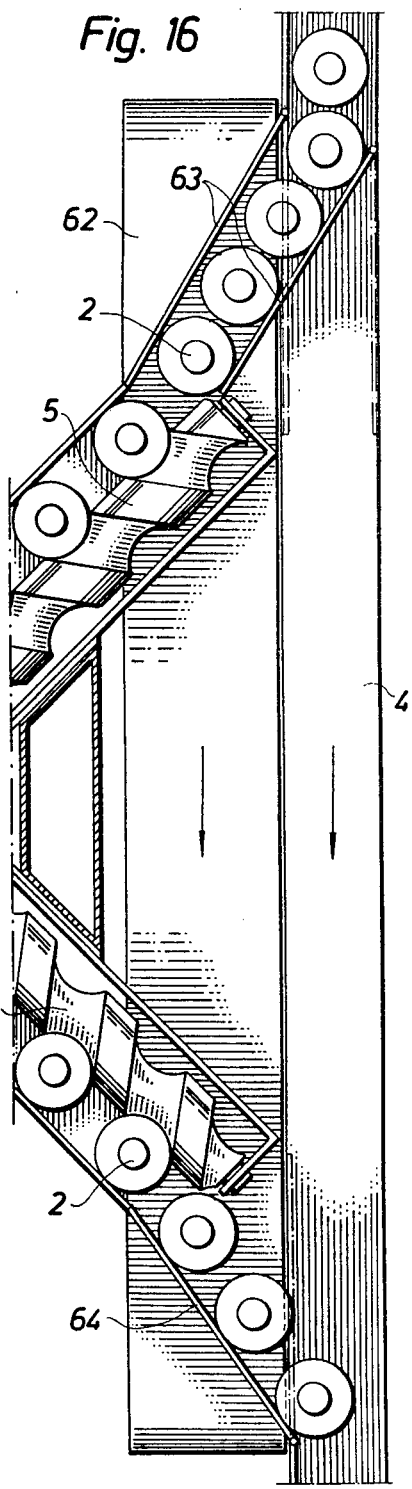

FIG. 16 is a view similar to FIG. 2 illustrating a portion of the feed arrangement according to an other embodiment of the invention.

Figure 17:
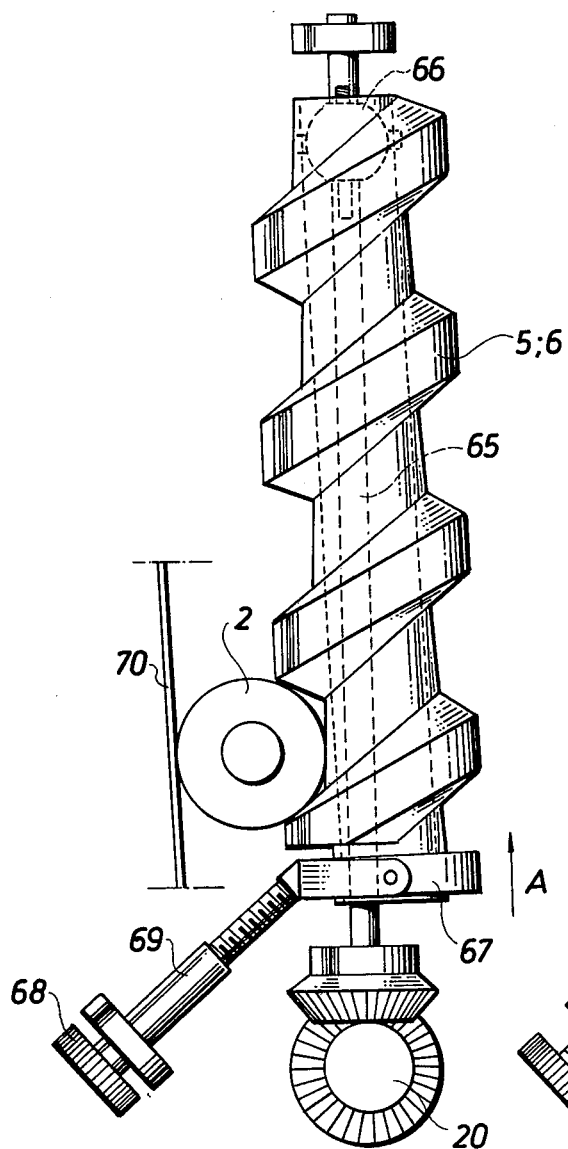
Figure 18:
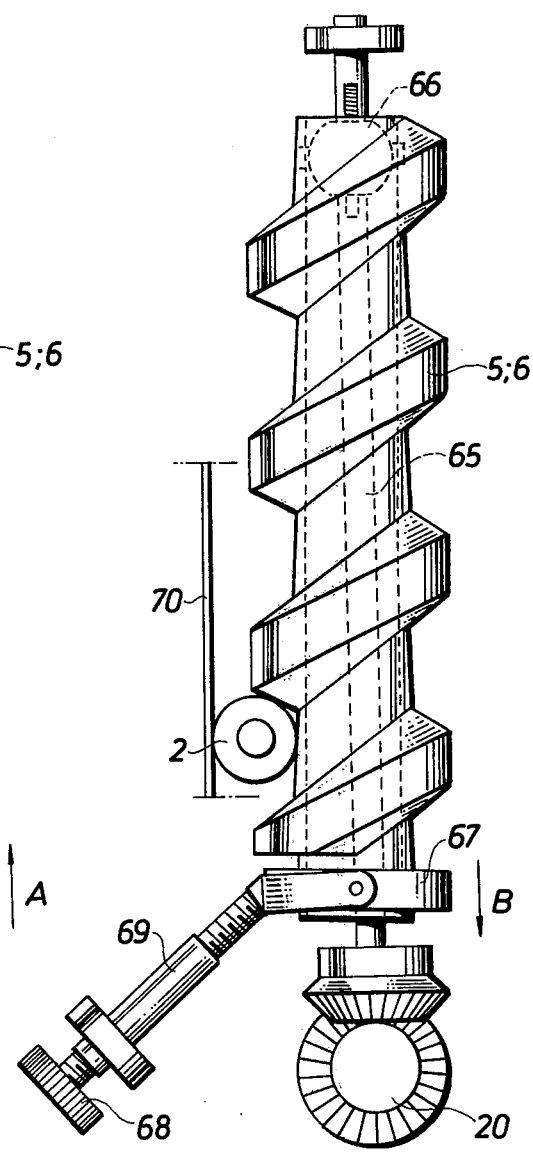

FIGS. 17 and 18 illustrate how the feed screws can be adapted to bottles of different diameters.

FIG. 19 illustrates alternative feed means.

Figure 1:
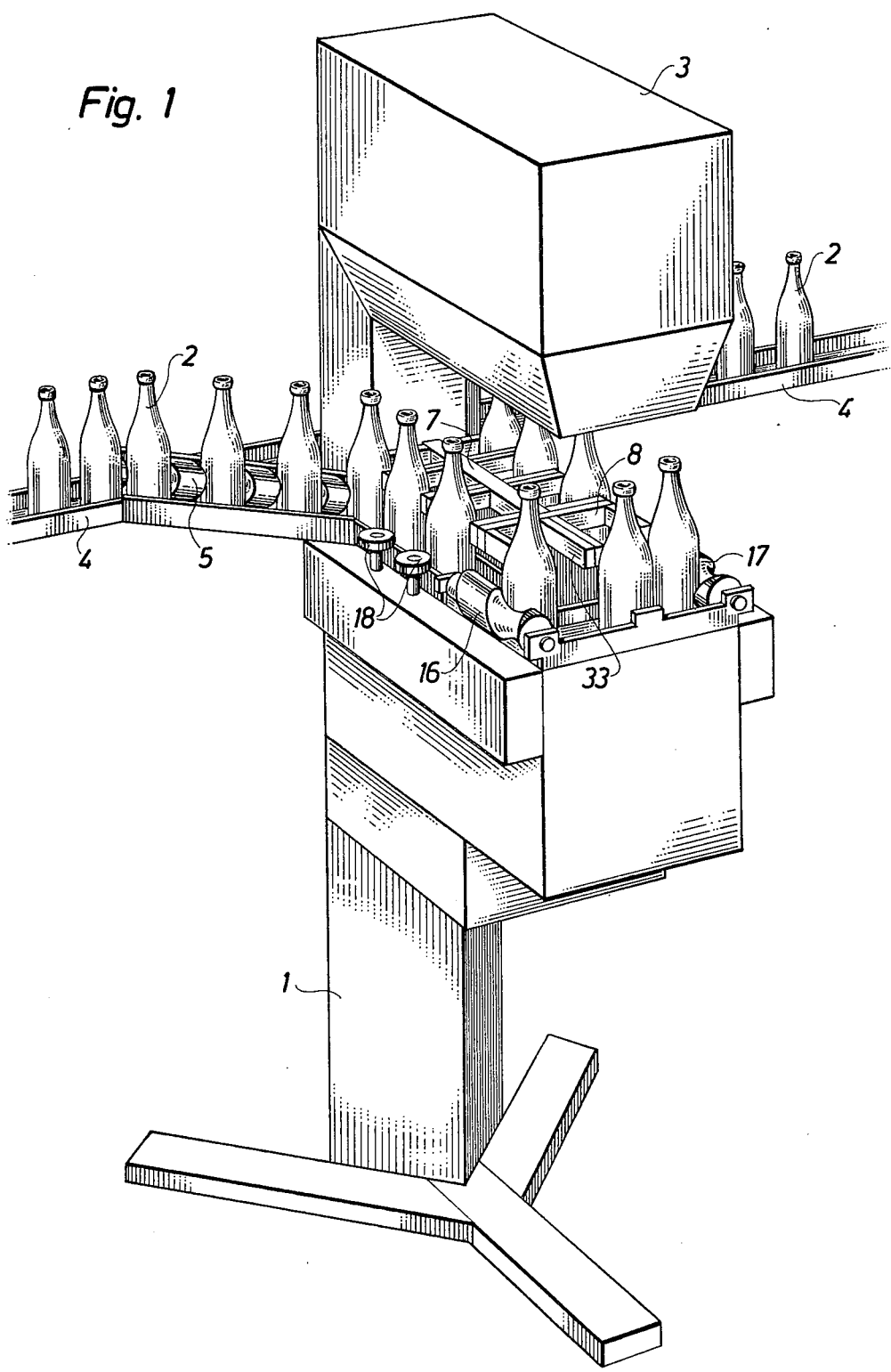
FIG. 1 is a perspective view of an inspection unit comprising a feed arrangement according to the invention.

The inspection unit illustrated in FIG. 1 comprises a feed arrangement according to the invention carried by a pillar-like structure 1. In the illustrated embodiment, the various means (not shown) for inspecting glass bottles 2 are located at the upper part 3 of the carrying structure. Certain inspection functions of these inspection devices, however, may require them to be arranged on one side of the bottles or beneath the same. The inspection devices may be manufactured as readily exchangeable unit of plug-in type and optical fibres may be used for transmitting light to the various devices from a central light source, for instance placed in the upper part 3. Since the inspection devices do not form any part of the present invention, however, these inspection devices have not been shown, form the sake of simplicity. The invention relates to the mechanical feeding of bottles from a production line or conveyor 4 through a number of inspection stations and back to the continuously moving conveyor 4. The bottles may be removed from and returned to the conveyor 4 by means of continuously driven feed screws 5 and 6, respectively, while the bottles are advanced stepwise between the inspection stations by means of a continually driven indexing mechanism comprising a carrier 7 having transverse dogging devices 8.

As will be seen from FIG. 1, the inspection apparatus in its entirety can be made extremely compactly in the form of a simple, movable unit which when used need only be placed adjacent a conveyor 4 for inspecting containers, such as the bottles 2, advanced thereon. Thus, when placing the apparatus in position it is only necessary for part of the side walls of the conveyor to be dropped down or moved to one side. The apparatus can readily be replaced by another if the first should bread down and one and the same apparatus can be used with different manufacturing lines at different points of time. One very important characteristic of the apparatus according to the invention is thus that it can be placed completely freely on one side of a conveyor without it being necessary to divide the conveyor or without requiring such connection as would make a quick exchange of the apparatus difficult or impossible.

FIG. 2 illustrates how the conveyor screws 5 and 6, when the apparatus is positioned adjacent a conveyor 4, may extend in over the conveyor for removing the bottles 2 therefrom and for returning said bottles thereto. To this end the conveyor screws 5 and 6 are journalled at their outer ends in stirrup-like members 9 and 10, respectively, thereby excluding the necessity of supporting the screws by means which surround the conveyor 4. Arranged by the side of the screws 5 and 6 are slide paths 11 and 12, respectively, on which the bottles 2 are advanced by means of the continuously rotating screws. The paths 11 and 12 can be adjusted to the level of the conveyor 4. At their inner ends the slide paths 11 and 12 merge with two parallel slide paths 13 and 14, along which the bottles are advanced stepwise by means of a continually driven advancing mechanism comprising carrier 7 and transversal dogging means 8. The bottles 2 will be advanced in opposite directions along the two parallel paths 13 and 14. The bottles are transferred from the terminal end of one of said paths 13 to the commencement end of the other path 14 by means of a transversal slide path 15 and two short continuously driven feed screws 16 and 17, respectively.

The apparatus illustrated in FIG. 2 comprises five inspection stations, two along each of the parallel paths 13 and 14 and one adjacent the transversal path 15. In each inspection station respective bottles 2 are pressed against a support surface which, with respect to the four inspection stations arranged along said parallel paths, comprise means 18 which cause the bottles to rotate. Those bottles which, when inspected, exhibit faults are rejected in a known manner before reaching the conveyor 4, by means of a plunger device 19.

As will be seen from FIG. 3, the feed screws 5 and 6 are driven from a common shaft 20 which also drives a further shaft 22 via a belt 21. Each of the shafts 20 and 22 is firmly connected to a respective crank arm 23 and 24, respectively, said crank arms being pivotally mounted to the carrier 7 at their outer ends, see FIG. 2. Thus, when the shafts 20 and 22 rotate the crank arms 23 and 24 will cause the carrier 7 and the dogging devices 8 to execute a continual parallel movement in a closed path, the dogging devices during one half of a movement cycle moving bottles 2 located on one path through one step in one direction and during the other half of the cycle move the bottles located on the other path through one step in an opposite direction, as will be described in more detail hereinafter. The shaft 22 drives a shaft 25 via an angle-transmission device, which shaft 25 in turn drives the short feed screws 16 and 17 via a belt 26. The shaft 22 also drives a further shaft 28 via a belt 27. On each of the shafts 22 and 28 there is arranged a camming curve 29 and 30, respectively, these camming curves being used to guide the pressing means located in respective inspection stations. All of the aforedescribed movements are accurately synchronized, since they originate from one and the same source, namely the driven shaft 20. The rotation-generating means 18 in the inspection stations along the parallel paths 13 and 14 is driven by a separate motor 32 via a belt 31.

As will be perceived from the aforegoing, the invention permits the construction of an extremely compact apparatus, which is extremely convenient since, inter alia, it will only block a small part of the length of the conveyor. One of the most important advantages afforded hereby, however, is that the mass of the movable components can be minimized, thereby ensuring that the bottles are handled gently and that the risk of damage to the machine in the event of an abrupt stop is reduced. The fact that the bottles are fed by the machine on two sides thereof by means of the dogging devices 8 projecting out in both directions from the carrier 7 means that only approximately half the number of bottles are dogged during each part of the working cycle, which results in a lower and substantially constant load on the motor.

In order to make it possible to adapt the apparatus to bottles of different height both the advancing device and the inspection devices can be raised and lowered relatively to slide paths 13 and 14.

Advancement of the bottles between the inspection stations along the two parallel paths 13 and 14 is effected, in accordance with the above, with the aid of the carrier 7 and the transverse dogging devices 8 carried thereby, said carrier executing a continuous parallel movement in a closed path. For the purpose of advancing the bottles stepwise along the transverse path 15, the carrier 7 is also provided with a dogging device 33 which protrudes in the longitudinal direction of said carrier. The mode of operation of the advancing mechanism will be described hereinafter with reference to FIGS. 4–7 of the drawings, said Figures illustrating the inner part of the advancing mechanism in different positions during a working cycle.

FIG. 4 illustrates that position in which the carrier 7 with the dogging devices 8 and 33 lies nearest the conveyor 4, i.e. the same position as that shown in FIG. 2. In this position of the carrier, the crank arms 23 and 24 are in line with the carrier 7. The carrier 7 and the dogging devices 8 and 33 are rotated from the position shown in FIG. 4 counterclockwise in an arcuate path, wherewith after moving through one quarter of a revolution they take the position shown in FIG. 5. The bottles 2 located on the slide path 13 have then been fed forward one half step from a respective inspection station, while the bottles located on the slide path 14 remain in the stations. The feed screws 16 and 17 have also moved the bottles in contact therewith through a corresponding distance. After rotating a further 90°, the position shown in FIG. 6 is reached. The bottles 2 on the path 13 have been advanced a further half step so that the leading bottle is now in contact with the feed screw 16 and the others have arrived at a forward station. Simultaneously herewith the dogging devices 33 projecting out in the longitudinal direction of the carrier have moved the bottles on the transverse path 15 one half step. The bottles on the path 14 remain in the original stations. FIG. 7 illustrates the position after the carrier 7 and the dogging devices 8 and 33 have been rotated a further 90°, the bottles on the path 14 having been removed one half step from respective inspecting stations and will reach the station lying in front of said respective inspection station subsequently being rotated a further 90°, whereupon a complete working cycle will have been completed. The bottles on the transverse path 15 have now completed their movement step. During the last mentioned two intervals, the bottles on the path 13 remain in respective inspection station.

It is possible to achieve very high feed rates with a bottle-advancing arrangement according to the above, since, among other things, the carrier 7 with the dogging devices 8 and 33 and the feed screws 5, 6, 16 and 17 are driven continuously and both engagement of the bottles 2 and the release thereof take place successively. As beforementioned, it is necessary, however to reduce dimensions as much as possible and therewith the mass of the dogging devices, in order to reduce the risk of damage to the machine if one of the bottles should be greatly deformed. This is achieved in accordance with the invention by the fact that the bottles are fed in and out by means of feed screws 5 and 6, respectively, the inner ends of which are located very close to one another. In order that the bottles shall be fed to the feed screws 16, 17 and 6 in a precise manner it is of great importance that the carrier 7 is provided with a further dogging device adjacent to each of the screws, the purpose of this dogging device being only to slow the bottles down and to stop them in the exact intake position of respective feed screws. The pitch of the feed screws may be constant or may vary along their length. For example, the pitch of the feed screws 16 and 17 may decrease in the feed direction and may be zero at the inner end thereof.

FIGS. 8 and 9 illustrate an alternative arrangement for transferring the bottles 2 from the terminal end of the path 13 to the commencement of the path 14, said arrangement comprising a roatable table-like device 51. The table 51 is provided with a multiplicity of compartments adapted to the bottles 2, each of said compartments being defined in the illustrated embodiment by a front and a rear holder arm 52 and 53, respectively, of which the front arm is preferably shorter than the rear arm. The table is driven continuously and synchronously with the carrier 7 provided with the dogging devices 8 via a drive belt 54, see FIG. 8. Although the table 51 is driven synchronously with the carrier 7, it may have a non-linear rotational speed, meaning that the speed varies in a predetermined manner during a working cycle.

As will be seen from FIG. 9, the dogging arms 52 and 53 of the table 51 gently catch bottles advanced to the end of path 13, and accelerate said bottles, as the table rotates, and transfer them to the commencement of the path 14 via an arcuate slide path 55, which path is defined outwardly by at least one arcuate guide strip 56 intended to co-act with the bottles 2 in the guidance thereof. The path 55 is also preferably provided with an arcuate guide strip 57 along its inner edge, said guide strip enabling the bottles 2 to be gently braked before they are discharged at the commencement of the path 14. Thus a table 51 of the type described enables the bottles to be transferred gently and quickly from the terminal end to the commencement end of the two parallel paths of the advancing arrangement.

The number of bottle-dogging compartments of the table 51 can vary, although the compartments shall be arranged in pairs such that the siezure and release of the bottles takes place simultaneously. In the illustrated embodiment the table is provided with four compartments, although it is, for example, also possible to use eight compartments. The compartments can be formed in the manner desired, the illustrated embodiment, however, comprising pairs of parallel dogging arms which, because of its simplicity, is a preferred embodiment. Preferably, the depth of respective compartments coincides substantially with the diameter of the bottles. The dogging arms 52 and 53 lie in a plane which is different from that in which the dogging arms 8 and the carrier 7 are arranged.

If, for some reason, space is limited, for example because of the feed screws or the bottle-inspection equipment, the dogging arms may be of telescopic construction, as indicated in FIGS. 4–7. It will be seen from FIGS. 5 and 7 that the transverse dogging arms 8 are adapted to be collapsed when passing an associated inspection station. To this end, the dogging arms may be constructed in the manner illustrated in FIG. 10. The dogging arms 8 of the embodiment illustrated in this Figure are telescopically collapsible, a spring 34 normally holding the dogging arms in an extended position. Mounted on the underside of the dogging arms are engagement means 35 which when a dogging arm moves out towards an associated slide path 13, 14, 15 or 55 during rotation of said arm, engages the inner sidewall of said path in a manner to collapse the dogging arm, so that it freely passes any obstacle which may be present.

FIG. 11 illustrates those means used for pressing the bottles 2 against intended support surfaces in respective inspection stations. As will be seen, the means for the four stations located along the parallel slide paths 13 and 14 are guided from the cam curve 30 arranged on the shaft 28, while corresponding means for the station arranged adjacent the transverse slide path 15 are guided by the cam curve 29 arranged on the shaft 22. The pressing means, however, are substantially identical to one another, and hence only one pair of means guided by the first mentioned cam curve 30 will be described.

It will be seen from FIG. 11 that the continuously driven cam curve 30 acts on a sloping part of an angle arm 36 associated with each pair of inspection stations, the two ends of which angle arm are pivotally mounted on two links 37 and 38, respectively, which are non-rotatably connected at their other ends with associated pressing arms 39 and 40, respectively. The connection point between each pair of said links 37 and 38 and pressing arms 39 and 40 is connected, via a link connection comprising two arms 41 and 42 and 43 and 44, respectively, with a block 45 and 46, respectively, displaceable along a rod, said blocks being biased by means of a spring 47 and 48, respectively. The block 46 is connected with a further pressing arm 40' via link arms 43',44'. The same also applies to the block 45. When the cam curve 30 is rotated, the angle arm 36 will move reciprocatingly, parallel to the slide paths 13 and 14 of the arrangement, which means that the blocks 45 and 46 and the pressing arms 39 and 39' and 40 and 40', respectively, will be pivoted either towards or away from a bottle located at a respective station, depending upon the direction in which the angle arm 36 moves. In the position illustrated in FIG. 11, the pressing arms in the stations along the path 13 are in engagement with associated bottles, while the bottles on the path 14 are free from corresponding pressing arms.

The pressing means according to the above can be automatically adapted to bottles 2 of different diameters, as illustrated in FIGS. 12 and 13. The only difference is, in this respect, that the cam curves 29 and 30 will work further out or further in on the sloping path of the associated angle arm, depending upon the diameter of the bottle. Thus, as the inner ends of the pressing arms 39, 39' and 40, 40' can be connected to the side walls of the slide paths, the only adjustment which need be made in this respect is that said side walls must be adjusted to the diameter of the actual bottle.

When the diameter of the bottles changes, however, the distance between the dogging arms 8 and 33 must be adjusted. As will be seen from FIG. 14, for the purpose of adjusting the arm 8, there is arranged in the carrier 7 a screw 49 which is in screw engagement with each dogging arm 8. The direction of the thread, however, is reversed from dogging arm to dogging arm, which means that when the screws are rotated they will either move towards or away from each other, depending upon the direction in which the screw is turned. Thus, this enables the distance between adjacent arms to be readily changed in exact conformity, in one single operation, from one end of the carrier 7. The arms 33 may also be adjusted in a corresponding manner.

FIG. 15 illustrates how the mutual distance between each pair of dogging arms 52 and 53 of the rotatable table 51 can be adjusted, in a similar manner, by turning a single screw 58 which is connected with corresponding screws along the other side edges of the table via angle drives 59, 60 and 61. These screws are arranged and function in the same way as those screws described with reference to FIG. 14 and hence require no further description.

FIG. 16 is a view similar to FIG. 2 illustrating a portion of another embodiment of the feed arrangement wherein the feed screws 5 and 6 extend in over a conveyor 62 forming a part of the feed arrangement. When the bottles 2 are transferred from the line conveyor 4 to the screw 5 and from the screw 6 to the line conveyor 4, respectively, they have to pass the conveyor 62. During the passage of the conveyor 62 the bottles are guided by guide means 63 and 64, respectively.

FIGS. 17 and 18 illustrate how the feed screws 5 and 6 can be constructed in order to be adjustable to bottles of different diameters. The screws 5 and 6 are provided with an axial bore having a greater diameter than the diameter of a drive shaft 65 driven from the common shaft 20, see FIG. 3. At the remote end of shaft 65 it is connected to the hollow screw 5 or 6 by means of a ball-shaped joint 66. The joint 66 is unrotatable fixed to shaft 65 and screw 5 or 6 but can slide along the shaft. At the opposite end shaft 65 is journalled in bearings 67 which can be moved together with the screw 5 or 6 in the axial direction of shaft 65 as indicated by the arrows A and B, respectively. The movements of the bearings 67 and screw 5 or 6 are caused by turning a screw 68 which passes through a fixed threaded sleeve 69. Besides the movements of the bearings 67 and screw 5 or 6 in the axial direction turning of the screw 68 will also result in a displacement of said elements in the transverse direction of the shaft 65.

By displacing the screws 5 and 6 both axially and transversally and moving the guide strips 70 relatively to the screws 5 and 6 the device can be adapted so that bottles 2 irregardless of their diameter are left and gripped by the screws 5 and 6, respectively, in positions in which the centre axis of respective bottles is in an predetermined position. This is required in connection with a feed mechanism of the type comprising a carrier 7 and dogging devices 8. If the screws can not be adjusted they have to be replaced when the diameter of the bottles is changed.

In FIG. 19 the feed screws 5 and 6 have been replaced by a feed conveyor or chain 71 forming a closed loop in that it passes over three wheels 72, 73 and 74. The two outer wheels 72 and 73 are free running, whereas the inner wheel 74 is driven from the shaft 20. The chain 71 comprises a plurality of pivotally connected sections 75 of different lengths which cooperate to form object advancing compartments. Instead to a chain the sections 75 can be attached to a belt or the like.

This type of feed means is especially suited for small bottles and may readily be adapted to bottles of different diameters by adjusting the distance between the sections 75 and the guide strips of the slide paths 11 and 12.

Although it is advantageous to use a single chain loop for feeding bottles both from and to the conveyor 4 a separate loop can be used instead of each of the feed screws 5 and 6 in FIG. 2.

The invention is not restricted to the illustrated embodiments, but can be modified within the scope of the following claims. Thus, the holder arms can be arranged to be urged against the bottles by the cam curve and to be drawn out of engagement therewith by means of the spring. Further, as illustrated in FIG. 11, a strip-shaped member 50 may be arranged to be moved in dependence upon rotation of the camming curve 29, so as to form a varying extension of the side walls of the slide path 13 and 14. The slide paths 11 and 12 may be replaced by short conveyors. Two or more dogging means may be stacked above each other to cooperate with the bottles at different heights. A rotatable table or the like may be placed between the feed means and the arrangement for feeding the objects between the inspection stations.

The expression "obliquely placed" used above with regard to the feed means and the arrangement for feeding the objects stepwise between the inspection stations merely means that said means shall form an angle with the main conveyor.

What I claim is:

1. An apparatus for guiding a series of objects, such as glass bottles, from a main conveyor and advancing said objects stepwise between a plurality of inspection stations and then returning said objects to said main conveyor, comprising; continuously driven feed means cooperating with a means for feeding the objects stepwise between the inspection stations, the apparatus being arranged to be freely positioned adjacent the conveyor and removable from that position to receive objects from the conveyor and wherein said feed means synchronously and with great accuracy are arranged to feed objects to a receiving position and to feed objects from a dispatch position of the means for feeding the objects stepwise between said inspection stations, said means for feeding arranged to feed said objects stepwise in opposite directions along two parallel paths using an elongate carrier arranged between the parallel paths and including dogging means projecting outwardly therefrom substantially perpendicularly to the paths, said carrier adapted to execute a continuous parallel movement in a closed path in a manner such that during one half of the movement cycle the dogging means move objects located on one path through one step in one direction and during the other half of said cycle move objects located on the other path through one step in the opposite direction and, said apparatus further comprising continuously driven means for transferring the objects from the terminal end of one of said parallel paths to the commencement of the other of said parallel paths.

2. An apparatus according to claim 1, wherein the means for feeding the objects stepwise between the inspection stations is obliquely placed with respect to the conveyor.

3. An apparatus according to claim 1, wherein said feed means are placed on the same side of the flow of objects as are the carrier provided with dogging means.

4. An apparatus according to claim 1, wherein the feed means comprises one feed screw for guiding the objects from the conveyor and one feed screw for returning the objects to the conveyor.

5. An apparatus according to claim 4, wherein the outer ends of the feed screws project freely over the conveyor, said screws journalled in stirrup-like holders and driven at their inner ends from a common shaft.

6. An apparatus according to claim 4, wherein the feed screws are displaceable both in the axial and the transverse directions.

7. An apparatus according to claim 6, wherein the feed screws are hollow, a drive shaft passes through each screw, and each of said shafts is driven at the inner end and pivotally connected to the respective screw at the outer end in such a manner that the screw can be axially displaced along said shaft.

8. An apparatus according to claim 1, wherein said carrier with said dogging means are moved by means of crank arms driven from a common shaft as the feed means.

9. An apparatus according to claim 1, wherein said continuous driven means for transferring the objects from the terminal end of one of said parallel paths to the commencement of the other of said paths comprises dogging means carried by said carrier, said dogging means extending substantially perpendicularly to a transverse path connecting said parallel paths.

10. An apparatus according to claim 9, wherein said feed means comprises a pair of feed screws for transferring the objects from one of said parallel paths to the transverse path and for transferring said objects from said transverse path to the other of said parallel paths.

11. An apparatus according to claim 1, wherein the means for transferring the objects from the terminal end of one of the parallel paths to the commencement end of the other of said paths comprises; rotatable carrier means driven continuously and synchronously with means for advancing said objects said carrier means provided with compartments adapted to the objects and arranged to feed, upon rotation of the rotatable carrier means the objects along an arcuate path, said arcuate path connecting the terminal end of one of said parallel paths with the commencement end of the other of said paths and being outwardly defined by at least one arcuate guide strip arranged to cooperate with said objects.

12. An apparatus according to claim 1, wherein the feed means comprises a chain or belt comprising sections forming object advancing compartments.

13. An apparatus according to claim 1, wherein the outer ends of the feed means project over a conveyor forming a part of the apparatus, which conveyor is arranged to be placed adjacent and in parallel to the main conveyor.

14. An apparatus according to claim 1, wherein the inspection stations comprise means for pressing the objects against support surfaces which suitably function as rotational devices, said means being guided by rotating cam curves driven synchronously with the movement of the dogging means, and which means are arranged to be automatically adjusted to objects of different diameters.

15. An apparatus for guiding a series of objects, such as glass bottles, from a conveyor and advancing said objects stepwise between a plurality of inspection stations and then returning said objects to said conveyor, comprising; continuously driven feed means cooperating with a means for feeding the objects stepwise between the inspection stations, the apparatus being arranged to be freely positioned adjacent the conveyor and removable from that position to receive objects from the conveyor and wherein said feed means synchronously and with great accuracy are arranged to feed objects to a receiving position and to feed objects from a dispatch position of the means for feeding the objects stepwise between said inspection stations, said means for feeding arranged to feed said objects stepwise in opposite directions along two parallel paths using an elongate carrier arranged between the parallel paths and including dogging means projecting outwardly therefrom substantially perpendicularly to the paths, and which said carrier adapted to execute a continuous parallel movement in a closed path in a manner such that during one half of the movement cycle the dogging means are caused to move objects located on one path through one step in one direction and during the other half of said cycle to move objects located on the other path through one step in the opposite direction and, said apparatus further comprising continuously driven means for transferring the objects from the terminal end of one of said parallel paths to the commencement of the other of said parallel paths wherein the means for transferring the objects from the terminal end of one of the parallel paths to the commencement end of the other of said paths comprises; rotatable carrier means driven continuously and synchronously with means for advancing said objects, said carrier means provided with compartments adapted to the objects and arranged to feed, upon rotation of the rotatable carrier means, the objects along an arcuate path, said arcuate path connecting the terminal end of one of said parallel paths with the commencement end of the other of said paths and being outwardly defined by at least one arcuate guide strip arranged to cooperate with said objects.

16. An apparatus according to claim 11 or 15, wherein each of said compartments is defined by substantially parallel side walls which include a pair of parallel dogging arms.

17. An apparatus according to claim 16, wherein said compartments are arranged in pairs in a manner such as to receive and release said objects simultaneously.

18. An apparatus according to claim 16, wherein the speed at which the rotatable carrier means rotates varies during a working cycle.

19. An apparatus for guiding a series of objects, such as glass bottles, from a conveyor and advancing said objects stepwise between a plurality of inspection stations and then returning said objects to said conveyor, comprising; continuously driven feed means cooperating with a means for feeding the objects stepwise between the inspection stations, the apparatus being arranged to be placed adjacent the conveyor to receive objects from the conveyor and wherein said feed means synchronously and with great accuracy are arranged to feed objects to a receiving position and to feed objects from a dispatch position of the means for feeding the objects stepwise between said inspection stations, said means for feeding arranged to feed said objects stepwise in opposite directions along two parallel paths using an elongate carrier arranged between the parallel paths and including dogging means projecting outwardly therefrom substantially perpendicularly to the paths, and which said carrier adapted to execute a continuous parallel movement in a closed path in a manner such that during one half of the movement cycle the dogging means are caused to move objects located on one path through one step in one direction and during the other half of said cycle to move objects located on the other path through one step in the opposite direction and, said apparatus further comprising continuously driven means for transferring the objects from the terminal end of one of said parallel paths to the commencement of the other of said parallel paths wherein said continuous driven means for transferring the objects from the terminal end of one of said parallel paths to the commencement of the other of said paths comprises dogging means carried by said carrier, said dogging means extending said substantially perpendicularly to a transverse path connecting said parallel paths.

20. An apparatus according to claims 1 or 19, wherein the length of the dogging means are telescopically adjustable.

21. An apparatus according to claims 1 or 19, wherein said carrier comprises at the terminal end of each path a dogging means which is intended solely to slow the objects down at associated discharge positions.

22. An apparatus according to claims 1 or 19, comprising screw means for adjusting the distance between the dogging means.

23. An apparatus for guiding a series of objects, such as glass bottles, from a main conveyor and advancing said objects stepwise between a plurality of inspection stations and then returning said objects to said main conveyor, comprising; continuously driven feed means cooperating with a means for feeding the objects stepwise between the inspection stations, said feed means including a pair of feed screws, the apparatus being arranged to be placed adjacent the conveyor to receive objects from the conveyor and wherein said feed means synchronously and with great accuracy are arranged to feed objects to a receiving position and to feed objects from a dispatch position of the means for feeding the objects stepwise between said inspection stations, said means for feeding arranged to feed said objects stepwise in opposite directions along two parallel paths using an elongate carrier arranged between the parallel paths and including dogging means projecting outwardly therefrom substantially perpendicularly to the paths, and which said carrier adapted to execute a continuous parallel movement in a closed path in a manner such that during one half of the movement cycle the dogging means are caused to move objects located on one path through one step in one direction and during the other half of said cycle to move objects located on the other path through one step in the opposite direction and, said apparatus further comprising continuously driven means for transferring the objects from the terminal end of one of said parallel paths to the commencement of the other of said parallel paths wherein the outer ends of the feed screws project freely over the main conveyor, said screws journalled in stirrup-like holders and driven at their inner ends from a common shaft.

24. An apparatus for guiding a series of objects, such as glass bottles from a main conveyor and advancing said objects stepwise between a plurality of inspection stations and then returning said objects to said main conveyor, comprising; continuously driven feed means cooperating with a means for feeding the objects stepwise between the inspection stations, the apparatus being arranged to be freely positioned adjacent the conveyor and removable from that position to receive objects from the conveyor and wherein said feed means synchronously and with great accuracy are arranged to feed objects to a receiving position and to feed objects from a dispatch position of the means for feeding the objects stepwise between said inspection stations, said means for feeding arranged to feed said objects stepwise in opposite directions along two parallel paths using an elongate carrier arranged between the parallel paths and including dogging means projecting outwardly therefrom substantially perpendicularly to the paths, and which said carrier adapted to execute a continuous parallel movement in a closed path in a manner such that during one half of the movement cycle the dogging means are caused to move objects located on one path through one step in one direction and during the other half of said cycle to move objects located on the other path through one step in the opposite direction and, said apparatus further comprising continuously driven means for tranferring the objects from the terminal end of one of said parallel paths to the commencement of the other of said parallel paths wherein the outer ends of the feed means project over a conveyor forming a part of the apparatus, said conveyor is arranged to be placed adjacent and parallel to the main conveyor.

* * * * *